US010703216B2

(12) United States Patent
Bartlett et al.

(10) Patent No.: US 10,703,216 B2
(45) Date of Patent: Jul. 7, 2020

(54) ADAPTIVE PLUG-IN REMINDER VIA SMART PHONE APPLICATION

(71) Applicant: FORD GLOBAL TECHNOLOGIES, LLC, Dearborn, MI (US)

(72) Inventors: Alexander Bartlett, Wyandotte, MI (US); Dylan Erb, Allen Park, MI (US); Bikram Singh, Royal Oak, MI (US); Jacob Wiles, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/150,981

(22) Filed: Oct. 3, 2018

(65) Prior Publication Data

US 2020/0108724 A1 Apr. 9, 2020

(51) Int. Cl.
*B60L 53/00* (2019.01)
*B60W 50/00* (2006.01)
*B60W 50/14* (2020.01)
*G06N 20/00* (2019.01)
*B60L 58/12* (2019.01)

(52) U.S. Cl.
CPC ............. *B60L 53/00* (2019.02); *B60L 58/12* (2019.02); *B60W 50/0097* (2013.01); *B60W 50/14* (2013.01); *G06N 20/00* (2019.01); *B60L 2250/16* (2013.01); *B60W 2050/146* (2013.01); *B60W 2510/244* (2013.01)

(58) Field of Classification Search
CPC ...... B60L 53/00; B60L 58/12; B60L 2250/16; G06N 20/00; B60W 50/14; B60W 50/0097; B60W 2050/146; B60W 2510/244
See application file for complete search history.

(56) References Cited

U.S. PATENT DOCUMENTS

| 8,718,844 | B2 | 5/2014 | Krause et al. |
| 8,849,742 | B2 | 9/2014 | Lovett et al. |
| 9,333,872 | B2 | 5/2016 | Maya et al. |
| 9,348,381 | B2* | 5/2016 | Khoo ........................ G06F 1/26 |
| 9,448,083 | B2* | 9/2016 | Loftus ................ G01C 21/3682 |
| 2009/0210357 | A1* | 8/2009 | Pudar .................. B60L 11/1842 |
| | | | 705/412 |
| 2010/0106401 | A1* | 4/2010 | Naito ................... G01C 21/343 |
| | | | 701/533 |
| 2010/0244782 | A1* | 9/2010 | Nagayama ............ H01M 10/44 |
| | | | 320/162 |
| 2011/0032110 | A1* | 2/2011 | Taguchi .................... B60L 3/12 |
| | | | 340/636.1 |
| 2011/0288765 | A1* | 11/2011 | Conway ............. G01C 21/3469 |
| | | | 701/533 |
| 2012/0016551 | A1* | 1/2012 | Krause .................. B60W 20/00 |
| | | | 701/32.3 |

(Continued)

Primary Examiner — Tyler J Lee
(74) Attorney, Agent, or Firm — David Kelley; Brooks Kushman, P.C.

(57) ABSTRACT

A vehicle includes a controller programmed to recognize a park event at a parking location, learn charging intention associated with the parking location, and, responsive to predicting an intention to charge the vehicle at the parking location and recognizing that a user has left a vicinity of the vehicle without connecting a charger, cause a device associated with the user to issue a charge reminder. The controller predicts the intention to charge based on contextual data from previous park events.

13 Claims, 3 Drawing Sheets

(56) References Cited

U.S. PATENT DOCUMENTS

2013/0110296 A1* 5/2013 Khoo .................. G06F 1/26
                                                    700/286
2019/0143831 A1* 5/2019 Birek .................. B60L 3/12
                                                    701/22

* cited by examiner

ADAPTIVE PLUG-IN REMINDER VIA SMART PHONE APPLICATION

TECHNICAL FIELD

This application generally relates to a system for reminding an electrified vehicle operator to connect the vehicle to a charger.

BACKGROUND

The electric driving range of electrified vehicles is affected by the amount of energy received from an external charger. For hybrid vehicles, this can affect the electric-only range before relying on an engine for propulsion. For vehicles having an electric-only powertrain, the driving range is determined by the charge received from an external source. For a variety of reasons, drivers of these vehicles may not charge the vehicle at every possible opportunity. When the driver does not charge the vehicle, the driving range and/or fuel economy may be affected. The worst case for the driver of an electric-only vehicle can be not having enough energy to travel to the next destination without stopping to charge.

SUMMARY

A vehicle includes a controller programmed to recognize a park event at a location, learn charging intention associated with the location, and, responsive to predicting an intention to charge the vehicle at the location and recognizing that a user has left a vicinity of the vehicle without connecting a charger, cause a device associated with the user to issue a charge reminder, otherwise, do not cause the device to issue the charge reminder.

The controller may be further programmed to learn charging intention using a machine learning algorithm that inputs contextual data from previous park events and associated charging events. The contextual data may include a time of day and a day of week of the park event. The contextual data may include a state of charge of a traction battery. The contextual data may include an expected preconditioning event prior to a next drive cycle. The contextual data may include an identification of the user. The controller may be further programmed to estimate a confidence level associated with the intention to charge and, responsive to the confidence level being less than a threshold, cause the device to issue the charge reminder according to a default reminder strategy. The controller may be further programmed to wirelessly communicate with a key fob and recognize that the user has left the vicinity of the vehicle responsive to detecting a loss of communication between the controller and the key fob. The controller may be further programmed to, responsive to a user changing a corresponding parameter setting via a user interface, bias predicting the intention to charge to reduce occurrences of issuing a charge reminder when the user does not intend to charge. The controller may be further programmed to, responsive to a user changing a corresponding parameter setting via a user interface, bias predicting the intention to charge to reduce occurrences of not issuing a charge reminder when the user intends to charge.

A charge reminder system for an electrified vehicle includes a controller programmed to learn user charging intention associated with parking locations based on contextual data and charge behavior corresponding to previous parking events, and, responsive to predicting an intention to charge at a present location and recognizing that a user has left the electrified vehicle without initiating charging, send a reminder to a remote device associated with the user, otherwise, do not send the reminder.

The contextual data may include a plurality of parameters and the controller is further programmed to predict user charging intention using a machine learning algorithm to process the parameters and charge behavior to generate an expected charging action based on the parameters associated with a present parking event. The controller may be further programmed to estimate a confidence level associated with the user charging intention and, responsive to the confidence level being less than a threshold, send the reminder according to a default reminder strategy that is not based on the contextual data. The controller may be further programmed to bias predicting the intention to charge to reduce false positives and false negatives responsive to a user changing a corresponding parameter setting via a user interface. The controller may be further programmed to, responsive to recognizing that the user has left the electrified vehicle without initiating charging, send a query to the remote device requesting if a charge behavior is intended and receive an associated response.

A method includes learning, by a controller, a charging intention for a vehicle of a user at a parking location based on charge behavior and contextual data from previous parking events. The method further includes causing, by the controller, a remote device associated with the user to issue a reminder responsive to contextual data from a present parking event corresponding to an intention to charge and the user leaving a vicinity of the vehicle without connecting a charger.

The method may further include recognizing, by the controller, the user leaving the vicinity of the vehicle responsive to a loss of communication between the controller and a key fob. The method may further include estimating, by the controller, a confidence level associated with the charging intention and, responsive to the confidence level being less than a threshold, causing the remote device to issue a reminder according to a default reminder strategy. The method may further include biasing, by the controller, predictions of charging intention to reduce occurrences of the remote device issuing a reminder when the user has no intention to charging responsive to the user changing a corresponding parameter setting via a user interface. The method may further include causing, by the controller, the remote device to present a query to the user requesting if the user intended to leave the vicinity of the vehicle without connecting a charger responsive to recognizing the user leaving the vicinity of the vehicle without connecting the charger.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
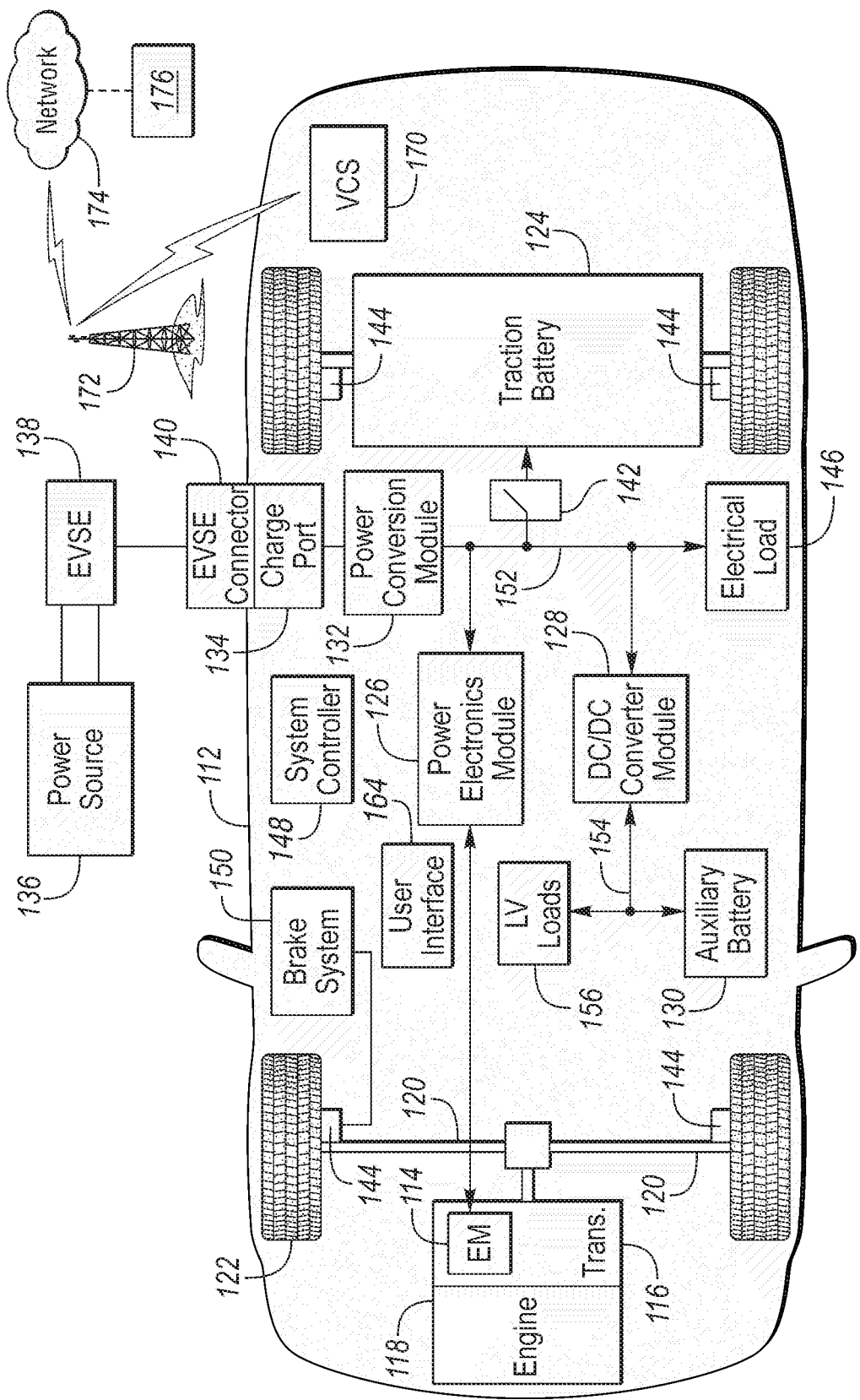
FIG. 1 depicts a possible configuration for an electrified vehicle.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 may be mechanically coupled to a differential 162 that is configured to adjust the speed of drive shafts 120 that are mechanically coupled to drive wheels 122 of the vehicle 112. The drive shafts 120 may be referred to as the drive axle. In some configurations, a clutch may be disposed between the hybrid transmission 116 and the differential 162. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be integrated with the traction battery 124. One or more power electronics modules 126 may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage bus 152. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

The electrified vehicle 112 may include one or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components. Note that operations and procedures that are described herein may be implemented in one or more controllers. Implementation of features that may be described as being implemented by a particular controller is not necessarily limited to implementation by that particular controller. Functions may be distributed among multiple controllers communicating via the vehicle network.

The vehicle 112 may include a user interface 164 for interfacing with the operator. The user interface 164 may include display elements, such as lamps or a liquid-crystal display (LCD) module. The display elements may include a touch screen. The user interface 164 may further include input devices, such as switches, buttons, or touch-screen inputs.

The vehicle 112 may include a vehicle communication system (VCS) 170 that is configured to communicate to device external to the vehicle 112. In some configurations, the VCS 170 may include a cellular communications interface that is configured to communicate with a cellular tower 172. The cellular tower 172 may be in communication with a network (or cloud) 174. The network 174 may be further in communication with a remote device 176. The remote device 176 may be a smart phone or tablet.

An electrified vehicle with plug-in capability may operate in an electric-only mode. The electric-only range may depend on the storage capacity and state of charge of the traction battery 124. To maximize electric-only range, the vehicle 112 may be electrically coupled to the EVSE 138 to charge the traction battery 124. Electric-only range may be affected when the user fails to plug in the vehicle. In the case of a purely electric vehicle, forgetting to plug in when the state of charge is low can result in the user being stranded or delayed.

Electrified vehicle users may have a routine for plugging in the vehicle. For example, many electrified vehicle users may plug the vehicle in when returning home. In some instances, a user may be distracted and forget to plug the vehicle in. In some instances, the driver may intentionally not plug in at home. In some cases, the user decision to plug in or not may be dependent on the state of charge of the traction battery when parking. For low states of charge, the user may decide to plug in. In some cases, the user may plug in at home on certain days but not others. A system for notifying the user to plug in may be beneficial.

A charge notification system may be configured to remind the user to connect the vehicle to a charger whenever the vehicle is parked and not connected to the charger. Such systems may provide a reminder whenever the vehicle is not plugged in after parking the vehicle. This may generate many notifications that are unnecessary. For example, when parking at a store, the user may have no intention or capability to plug in. A reminder in this situation is not useful.

A notification may be purely location based and learn typical charge locations that the user visits. The system may be configured to provide a reminder whenever the user parks at these locations and does not connect to a charger. However, this does not factor in the typical habits of the driver. The driver may intentionally not connect to a charger every time at these locations. User charging preferences may vary depending on the situation. Charge reminders that do not factor in contextual data may tend to over-remind. Reminders that are issued when not necessary or desired may annoy the user and lead to the user ignoring the reminders. An improved system may attempt to better determine the plug-in habits of the user to generate a more accurate reminder.

An improved charge notification system may include a machine learning component that learns the charging intention based on contextual data when the vehicle is parked. The machine learning component may learn the user's charging habits and may trigger a reminder in response to a deviation from the normal charging habits. The reminder may be sent to the remote device 176. The remote device 176 may execute an application (e.g., MyFordMobile application) that is configured to receive, manage, and communicate the charge notifications. In some configurations, the charge reminder may be sent as a text message to the remote device 176. In some configurations, the reminder may be sent as an email to an email address associated with the user which may be viewed on the remote device 176. The remote device 176 may be associated with the user. The charge notification system may allow for the user to input information regarding the remote device 176, such as a phone number. In some configurations, a registration process may be performed to coordinate the vehicle and the remote device 176. For example, the user may be prompted to set up an account and link the vehicle to the account so that communication between the vehicle and application can be established.

The machine learning component may be tuned to reduce the occurrence of false negatives (e.g., no reminder when charging is preferred) and/or false positives (e.g., a reminder when charging is not intended). The machine learning component may be tunable to bias the system for reducing the occurrent of false negatives and/or false positives based on the user preference. For example, a corresponding parameter for the bias setting may be presented in the user interface 164 to permit setting the desired performance.

The machine learning component may be implemented as a sequence of program instructions in a controller (e.g., system controller 148). The machine learning component may be configured to learn the charge intention of the user and provide a prediction of the charge intention of the user. The machine learning component may be trained from contextual user data relating to the charging habits of the user. The contextual data may include data from previous or historical parking events. Each parking event may have a set of contextual data and an associated charging event (e.g., charger connected or not connected). As more charge cycles and the corresponding contextual data are observed, the predictions may become more accurate.

The machine learning component may use a number of inputs to ascertain the charge intention of the user. The collection of inputs may be initiated by the detection of a park event. A park event may be detected in response to a transmission gear selector being in a park position. The park event may be further conditioned on vehicle speed being below a near-zero threshold. The park event may be detected in response to a key or ignition switch being switched to an off position.

Figure 2:
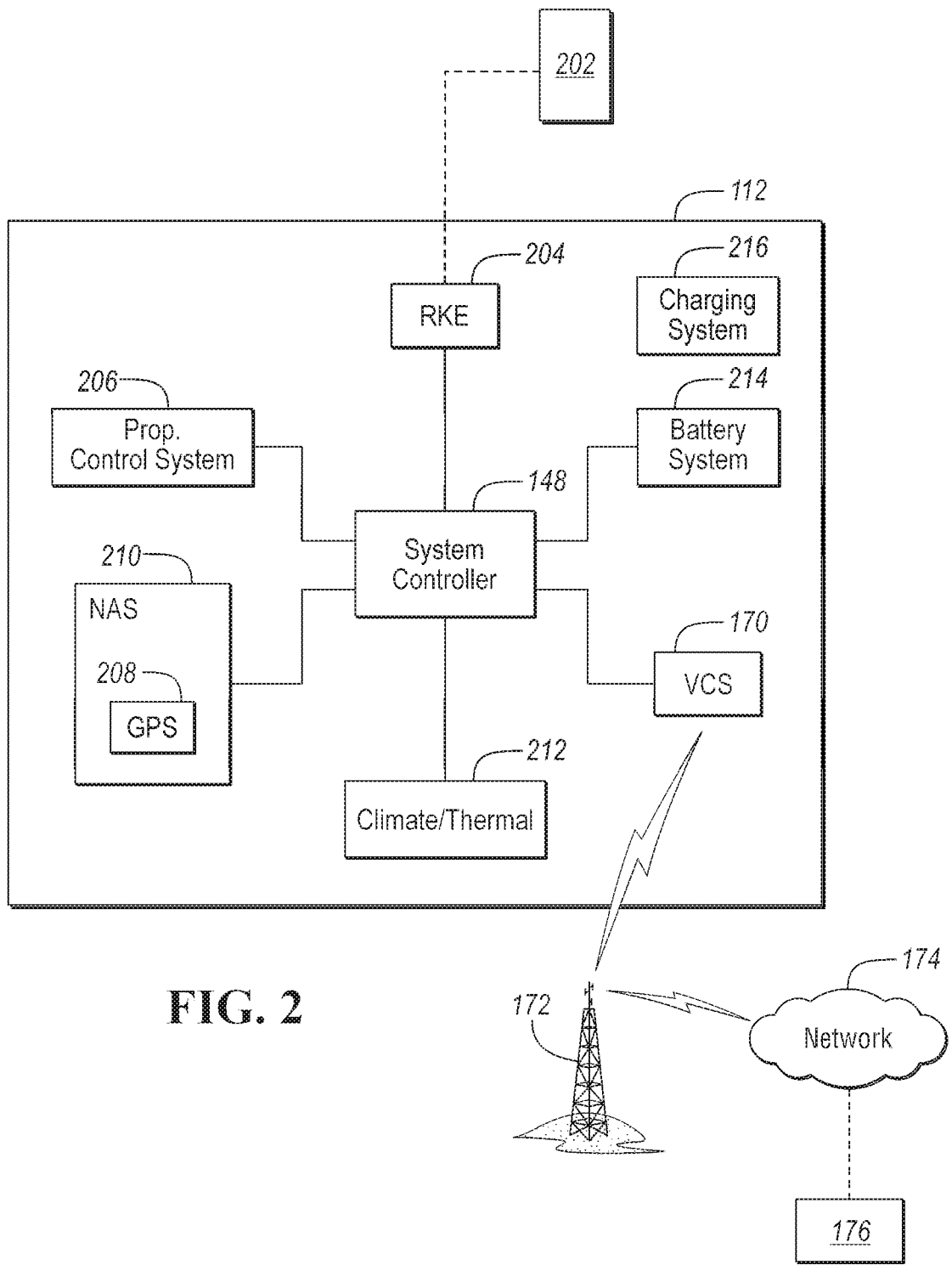
FIG. 2 depicts a possible configuration for a charge reminder system.

FIG. 2 depicts a block diagram of the vehicle 112 and components related to a charge notification system. The system controller 148 may interface with a variety of on-board modules and systems to receive inputs for determining the charge intention (plug-in intent) of the user. The system controller 148 may interface with a navigation module 210 that includes a Global Positioning Satellite (GPS) interface 208. The GPS interface 208 may provide time and location information for the navigation module 210. The navigation module 210 may provide the time of day and day of the week to the system controller 148. The navigation module 210 may provide a current position to the system controller 148. For example, the navigation module 210 may provide position so that the system controller 148 may determine the park position/location of the vehicle 112. The navigation module 210 may periodically transmit position data to the system controller 148 or the system controller 148 may request position data from the navigation module 210 when desired. The navigation module 210 may also include a database of charger locations (e.g., public charger, home charger, work charger). In some configurations, the navigation module 210 may be updateable to receive current information regarding maps and charger locations. The database of charger locations may also be updated when a charging event is detected at a location.

The system controller 148 may interface with a propulsion control system or module 206. The propulsion control system 206 may be configured to control the propulsion system (e.g., hybrid or electric). The propulsion control system 206 may provide a gear shift status that is indicative of the drive mode of the powertrain. The drive mode may include park, neutral, drive, and reverse. The propulsion control system 206 may also provide a signal indicative of the vehicle speed.

The system controller 148 may interface with a climate/thermal control module 212. The climate/thermal control module 212 may be configured to control and operate a cabin climate control system. The climate/thermal control module 212 may be configured to provide heating and cooling to the cabin during a drive cycle. For example, the climate/thermal control module 212 may be configured to control a cabin temperature to a user-input set point. The climate/thermal control module 212 may be configured to precondition the cabin prior to a next drive cycle. The precondition cycle may be configured and/or initiated by the user. As an example, the user may trigger a precondition event to heat the vehicle to a predetermined temperature while the vehicle is plugged into the charger. This allows the cabin to be preconditioned without having to use battery power which may extend the electric-only range of the vehicle 112. The climate/thermal control module 212 may provide temperature information and precharge status to the system controller 148.

The system controller 148 may interface with a battery system controller 214. The battery system controller 214 may be configured to control and operate the traction battery 124. The battery system controller 214 may be configured to compute battery parameters such as battery state of charge. The battery state of charge is an indication of an amount of energy stored in the traction battery. State of charge may be indicated as a percentage of the maximum battery storage capacity. In addition, battery temperature may be provided. The battery system controller 214 may be further configured to manage battery preconditioning while the vehicle is plugged into the charger. For example, the battery may be heated or cooled to a predetermined temperature using utility power prior to a drive cycle.

The system controller 148 may interface with a remote keyless entry (RKE) system 204. The RKE system 204 may be configured to wirelessly communicate with one or more key fobs 202 to lock and unlock doors of the vehicle 112. The RKE system 204 may also be configured to detect which of the key fobs 202 is being used by the vehicle operator. The key fobs 202 may be assigned to different users and can be used to configure vehicle parameters associated with the different users. For example, each user may configure personal vehicle settings such as cabin temperature, seat position, and radio stations that may be retrieved upon identification of the corresponding key fob. The RKE system 204 may be also be configured to detect the presence of the key fobs 202 within proximity to the vehicle 112. When a distance of the key fobs 202 from the vehicle 112 exceeds a predetermined distance, communication with the RKE system 204 may be interrupted. This interruption or loss of communication may be used to determine when the user has left the area proximate the vehicle. In some configurations, the key fobs 202 may be configured to provide feedback to the user. For example, the key fobs 202 may be configured with a light-emitting diode (LED) light to visually communicate a status. The key fobs 202 may be configured with a haptic feedback mechanism to cause a vibration to communicate a status.

The system controller 148 may interface with a charge system controller 216. The charge system controller 216 may be configured to manage charging of the traction battery 124. The charge system controller 216 may provide a signal that indicates that the EVSE connector 140 is plugged in to the charge port 134. The charge system controller 216 may provide information regarding the charge schedule (e.g., if delayed charging is selected). The charge system controller 216 may also interface with the EVSE to determine a type of charger that is connected. The type or level of the charger (e.g., level 1, 2, or fast charge) may indicate the amount of power that the charger can supply and the amount of time required to charge. It may be more likely that a user connected to a fast charging charger intends to charge.

The system controller 148 may implement a machine learning algorithm to determine the charge intention of the user. The machine learning algorithm may monitor the contextual data related to charge intention when the vehicle is parked. The machine learning algorithm may use a variety of inputs. The machine learning algorithm may be configured to observe and process the inputs at each vehicle park event. The state of the inputs may correlate to the user charge intention. The machine learning algorithm may learn the charge intention by monitoring the inputs and the plug-in status over a number of park events.

The following describes some of the inputs that may be used by the machine learning algorithm. The battery state of charge may be used to determine the charge intention. The battery state of charge may be related to the user plug-in intent. For example, when parked with a low battery state of charge, it may be more likely that the user intends to plug-in the vehicle. By monitoring the state of charge for each parking event and the corresponding user charge behavior, it is possible to infer a charge intention. In the case in which the user parks at a charger on a regular basis, the state of charge for each parking event may be monitored. The system may compute the average state of charge for parking events in which the user connected the vehicle to a charger. The system may compute the average state of charge for parking events in which the user did not connect the vehicle to the charger. Other statistical quantities may be computed as well. The charge behavior for future parking events at the parking location may be predicted based on the state of charge when parking. For example, if the state of charge at a subsequent parking event at the parking location is within a predetermined range of the average state of charge in which the user connected the charger, then the system may predict an intention by the user to charge.

The time of day and day of week may be used to determine the charge intention. The time of day and day of week may be useful when associated with past user charge behavior. For example, the user may have a routine schedule that may be determined from the time of day and day of week. For example, the user may drive to work at 8:00 am on weekdays and arrive at work at 8:30 am. When parking at work, the user may plug in the vehicle. The system controller 148 may monitor this behavior over time to determine a pattern of plug-in behavior.

The temperature and season (time of year) may also be used. The temperature may provide an indication of a desire for cabin preconditioning in extreme hot or cold conditions. In extreme temperature conditions it is more likely that cabin preconditioning would be desired. In addition to temperature and season, the system controller 148 may check a precondition schedule to determine when preconditioning is scheduled. Knowing that a preconditioning event is approaching may indicate an intention to plug in the vehicle.

The parking location may be considered for determining the charge intention. The system controller 148 may monitor the parking location and compare to the behavior at the same parking location in the past. If a user charges on a regular basis at the parking location, it may be likely that the user intends to charge again. The parking location may be derived from the GPS system 208.

The system controller 148 may monitor the proximity to a charger based on the parking location. The current parking location may be compared to historical parking locations and the plug-in behavior during the historical parking events. The system controller 148 may determine that a public charge or home/work charger is in the vicinity of the parking location. Parking locations not associated with a charger should not generate a charge reminder. The system controller 148 may monitor the past charging behavior or usage history at parking locations having a charger. The usage history may be used to determine the charge intent.

The system controller 148 may use information as to the specific driver of the vehicle. For example, the system controller 148 may detect the driver based on the key fobs 202. Each driver may have a different plug-in behavior.

The system controller 148 may use charging information from other drivers charging behavior to determine the charge intention. Each vehicle may communicate charge information via the network 174 to a remote server. The remote server may aggregate the charge information and determine the charge intention for all users. The aggregated charge intention may be used as a default strategy in some situations. For example, the user may arrive at a charge station at which the user has not previously parked. The system controller 148 may receive aggregated charge intention data via the network 174. The system controller 148 may determine the charge intention based on the aggregated charge intention data. If the user makes additional visits to the charge station, the system may learn the individual user charge behavior and rely less on the aggregated charge intention data.

Each time the user parks, the charging status or behavior may be monitored along with the various inputs. Over time, the machine learning algorithm learns which combination of inputs most accurately predicts the user plug-in intent. Once trained, the algorithm can send a charge notification or plug-in reminder to the user if a situation is detected in which the user likely intended to plug-in but forgot. The contextual data of the present park event may be processed by the algorithm to determine the expected charge behavior.

The machine learning algorithm may include a Naïve Bayes algorithm, K-nearest neighbors algorithm, logistic regression, and decision tree learning. In addition, a neural network scheme may be used. The contextual data may be provided to the machine learning algorithm along with the corresponding charge behavior. The machine learning algorithm may adjust weighting factors associated with the contextual data elements. The machine learning algorithm may process statistical parameters associated with the learning process to evaluate the effectiveness of the learning. For example, the system may compute a confidence value associated with a charge prediction that provides a measure of confidence in the predicted value. The confidence level may express a probability that the prediction is correct. The confidence level may be determined by statistics of the contextual data and charge behavior.

The machine learning algorithm may be initialized with default parameters. The system may generate a notification based on a default notification scheme until the user charge intention based on the contextual data is sufficiently learned. The system may use the default notification scheme until the system is adequately trained. For example, the default notification scheme may send a reminder to the remote device when the vehicle is parked near a charger and not plugged in. Over time, the machine learning algorithm will learn the desired charge intention based on the contextual data and the system may generate the notification based on the machine learning algorithm output. In the training mode, the system may be configured to send a query to the remote device 176 to determine the actual user intent. For example, the query may ask if the user intended to plug in the vehicle. The algorithm may receive the response and update the parameters accordingly.

The system controller 148 may send a notification via the VCS 170. The user may receive the reminder on the remote device 176. The remote device 176 may be programmed to return a response to the reminder. For example, the application may present a question or a pop-up dialog box regarding the user charge intention. The user may answer with their desired charge intention. For example, the user may answer with a selection that indicates that the user did not intend to charge during this park event. The response may be sent back to the system controller 148 and may be included as part of the contextual training data for future predictions. Over time, this may improve the accuracy of the charge notification.

In some configurations, the notification may be sent via the key fobs 202. If the key fobs 202 are configured to provide feedback to the user, a signal may be sent to the key fobs 202. The signal may be a command to provide haptic, visual, and/or audio feedback the user when the vehicle is not connected to the charger. The key fobs 202 may be configured to respond immediately to the signal to provide feedback. The signal may also be a command to provide haptic, visual, and/or audio feedback the user upon a loss of communication between the key fobs 202 and the vehicle.

The charge notification system may include user-defined preferences. The preferences may be adjustable by the user via the user interface. The notification system may allow the user to bias the prediction toward avoiding false positives or false negatives. This allows the user to tailor the notifications to individual preferences. For example, the parameter may be associated with the confidence level of the predicted value. The adjustable parameter may change a confidence level threshold for predicting the desired charge state. The system may be configured to bias predicting the intention to charge to reduce occurrences of issuing a charge reminder when the user does not intend to charge. The system may be configured to bias predicting the intention to charge to reduce occurrences of not issuing a charge reminder when the user intends to charge. Changing the bias may be responsive to the user changing a corresponding setting via the user interface.

The notification system may also consider the proximity of the user to the vehicle. A period of time may be allowed before issuing a reminder to permit the user time to connect the vehicle to a charger. For example, the notification may not be sent immediately upon ignition off. However, the system may ensure that the user does not get too far from the vehicle. Additional signals may be monitored to ensure that the user has left or is leaving the vicinity of the vehicle. In some configurations, a signal indicative of a door (e.g., driver-side door) being opened and/or closed may be monitored. The door open signal may be indicative of the driver leaving the vehicle. A subsequent door closed signal may be indicative of the driver having exited the vehicle. The vehicle may be equipped with a charge port door that provides a signal when opened and/or closed. The system controller 148 may further monitor the RKE system 204 to detect if the key fobs 202 are out of range of the vehicle 112. If the key fobs 202 are out of range, it is likely that the user has left the area of the vehicle. The reminder may be sent responsive to the key fob being out of range of the vehicle. The notification system may send the reminder responsive to expiration of a predetermined amount of time of the key fob being out of range. The reminder may also be sent after a predetermined amount of time has expired after the park event. For example, in some situations, the key fob may remain within range of the vehicle (e.g., parked in garage at home). In these situations, communication may not be lost with the key fobs 202. The reminder may be sent after a predetermined time delay (e.g., 30 seconds) after the park event is detected. The condition for causing the reminder may be when a loss of communication with the key fob is detected or the predetermined time delay after the park event has expired.

The charge reminder system may be configured to recognize the park event at a parking location. The parking location may be defined by GPS coordinates. The system may be configured to learn the charging intention associated with the parking location based on the contextual data and charge behavior of prior parking events. The system may cause a device (e.g., cell phone, key fob) associated with the user to issue a charge reminder responsive to predicting an intention to charge the vehicle at the parking location and recognizing that a user has left a vicinity of the vehicle without connecting a charger.

Figure 3:
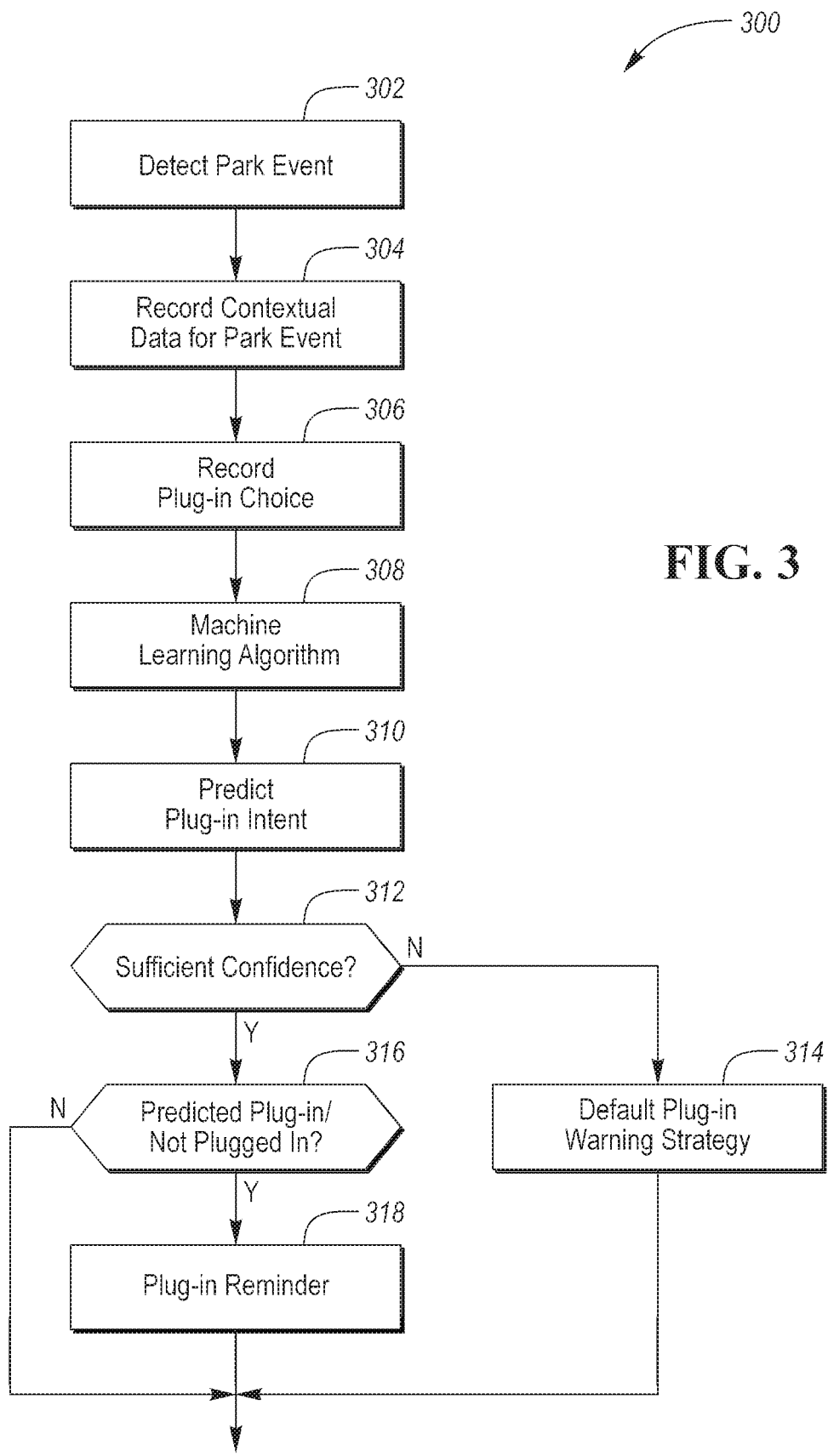
FIG. 3 depicts a possible flowchart for implementing a charge reminder system for an electrified vehicle.

FIG. 3 depicts a flow chart 300 depicting a possible sequence of instructions for implementing the charge reminder system. At operation 302, the system may be programmed to detect a park event. The park event may be conditioned upon vehicle speed being less than a predetermined speed (e.g., 0.5 km/hr) and/or the transmission gear being in a park state. If a park event is detected, operation 304 may be performed.

At operation 304, the system may record contextual data associated with the park event. The system may record the battery state of charge, time of day, day of week, temperature, season, expectation of preconditioning, park location, proximity to public charger, proximity to home or work charger, usage history at a given charger, and driver of the vehicle. Other variables may be recorded as well.

At operation 306, the plug-in choice is recorded for the park event. The plug-in choice may be recorded when the system determines that the user has left the vicinity of the vehicle. When the charger is plugged in, the choice may be recorded when detecting that the EVSE connector is coupled to the charge port.

At operation 308, the machine learning algorithm may be performed to process the inputs and plug status to update the prediction model. The machine learning algorithm may process the historical contextual data and corresponding charge behaviors. At operation 310, the system may predict the plug-in intent based on the present contextual data. The present contextual data may be supplied to the machine learning algorithm to generate a predicted plug-in intent. At operation 312, a check may be performed to determine if the learning algorithm has achieved sufficient confidence in the prediction. A measure of confidence may be the achievement of a predetermined number of park events for which contextual data has been collected. Other measures may include computation of a confidence value of the learning algorithm exceeding a threshold. If there is not sufficient confidence in the prediction, operation 314 may be performed.

At operation 314, a default reminder strategy may be performed. The default strategy may be to provide a warning at each park event that occurs without plugging in. Other default strategies may also be implemented. For example, the default strategy may include the charge intention data of other users as described previously.

If there is sufficient confidence in the prediction, then operation 316 may be performed. At operation 316, the predicted plug-in intent is compared to the plug status. If the algorithm has predicted a plug-in intent and the vehicle is not plugged in, then operation 318 may be performed.

At operation 318, a plug-in reminder is generated and sent to the user. The reminder or notification may cause the remote device to vibrate or generate an audible noise to alert the user. The reminder may also cause a message to be displayed on a screen of the remote device of the user. In some configurations, the notification may query the user to determine if the charge behavior was the desired behavior. If the algorithm has predicted no plug-in intent or the vehicle is plugged in, no reminder is sent. The notification may be delayed until the system recognizes that the user has left a vicinity of the vehicle. Generating the notification may be responsive to predicting an intention of the user to charge the electrified vehicle at the present parking location and recognizing that the user has left the electrified vehicle without initiating charging If the charge reminder system predicted that the user would not plug in, no reminder is generated. If the system predicted that the user would plug in and the vehicle is connected to a charger, no reminder is generated.

The charge reminder system improves the customer charging experience by only providing reminders that are necessary. The reminder system smooths the transition to electrified vehicles for customers that are not used to plugging in their vehicles. The reminder system reduces the chances of customers having low charge due to forgetting to plug in. Since the algorithm is adaptive, it learns over time from the contextual data and reduces the number of false positive or false negative reminders.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a controller programmed to
        wirelessly communicate with a device external to the vehicle and associated with a user of the vehicle,
        recognize a park event at a location,
        learn charging intention for a user associated with the location,
        estimate a confidence level associated with the charging intention,
        responsive to the confidence level being greater than a threshold and recognizing that the user has left a vicinity of the vehicle without connecting a charger to the vehicle, wirelessly communicate with the device to cause the device to issue a charge reminder, and
        responsive to the confidence level being less than the threshold and recognizing that the user has left the vicinity of the vehicle without connecting the charger to the vehicle, cause the device to issue the charge reminder according to a default reminder strategy, otherwise do not cause the device to issue the charge reminder.

2. The vehicle of claim 1 wherein the controller is further programmed to learn charging intention using a machine learning algorithm that inputs contextual data from previous park events and associated charging events.

3. The vehicle of claim 2 wherein the contextual data includes a time of day and a day of week of the park event.

4. The vehicle of claim 2 wherein the contextual data includes a state of charge of a traction battery.

5. The vehicle of claim 2 wherein the contextual data includes an expected preconditioning event prior to a next drive cycle.

6. The vehicle of claim 2 wherein the contextual data includes an identification of the user.

7. The vehicle of claim 1 wherein the controller is further programmed to wirelessly communicate with a key fob and recognize that the user has left the vicinity of the vehicle responsive to detecting a loss of communication between the controller and the key fob.

8. A charge reminder system for an electrified vehicle comprising:
    a controller programmed to
        learn user charging intention associated with parking locations based on contextual data and charge behavior corresponding to previous parking events,
        estimate a confidence level associated with the user charging intention,
        responsive to the confidence level being greater than a threshold and recognizing that the user has left a vicinity of the electrified vehicle without initiating charging, send a reminder via wireless communication to a remote device that is separate from the vehicle and associated with the user, and
        responsive to the confidence level being less than the threshold and recognizing that the user has left the vicinity of the electrified vehicle without initiating charging, send the reminder according to a default reminder strategy that is not based on the contextual data, otherwise do not send the reminder.

9. The charge reminder system of claim 8 wherein the contextual data includes a plurality of parameters and the controller is further programmed to learn user charging intention using a machine learning algorithm to process the parameters and charge behavior to generate an expected charging action based on the parameters associated with a present parking event.

10. The charge reminder system of claim 8 wherein the controller is further programmed to, responsive to recognizing that the user has left the vicinity of the electrified vehicle without initiating charging, send a query to the remote device requesting if a charge behavior is intended and receive an associated response.

11. A method comprising:
    by a controller,
        learning a charging intention of a user for a vehicle at a parking location based on charge behavior and contextual data from previous parking events;
        causing a remote device that is separate from the vehicle and associated with the user to issue a reminder responsive to contextual data from a present parking event corresponding to an intention to charge and the user leaving a vicinity of the vehicle without connecting a charger to the vehicle;

estimating a confidence level associated with the charging intention; and responsive to the confidence level being less than a threshold, causing the remote device to issue a reminder according to a default reminder strategy.

12. The method of claim 11 further comprising recognizing, by the controller, the user leaving the vicinity of the vehicle responsive to a loss of communication between the controller and a key fob.

13. The method of claim 11 further comprising causing, by the controller, the remote device to present a query to the user requesting if the user intended to leave the vicinity of the vehicle without connecting a charger responsive to recognizing the user leaving the vicinity of the vehicle without connecting the charger.

* * * * *